United States Patent

[11] 3,552,696

| [72] | Inventors | Emil H. Orenick;<br>Emil J. Orenick, 9011 W. Moreland Road, Parma, Ohio |
|---|---|---|
| [21] | Appl. No. | 828,869 |
| [22] | Filed | May 29, 1969 |
| [45] | Patented | Jan. 5, 1971 |

[54] CABLE RETAINER
1 Claim, 8 Drawing Figs.

| [52] | U.S. Cl. | 248/68, 24/73, 248/71, 248/74 |
|---|---|---|
| [51] | Int. Cl. | F16l 3/22 |
| [50] | Field of Search | 248/74PB, 71, 68; 24/16PB, 73.7 |

[56] References Cited
UNITED STATES PATENTS

| 2,969,216 | 1/1961 | Hallsey | 248/71 |
| 3,144,695 | 8/1964 | Budwig | 248/74X |
| 3,463,427 | 8/1969 | Fisher | 24/16X |

*Primary Examiner*—Chancellor E. Harris
*Attorney*—Sanford Schnurmacher

ABSTRACT: A loop retainer for securing and supporting cables, wires, electrical components, and the like, from structural members, comprising an elongated strap having an anchor-plug at one end thereof for securing said end to a structural member. A separate lock-head, having a slot for receiving the free end of the strap therethrough, insertable in the anchor-plug to permanently anchor both the looped strap and the anchor-plug on the structural member, to provide a retainer loop of any desired capacity, limited only by the length of the strap.

PATENTED JAN 5 1971      3,552,696

INVENTORS.
EMIL H. ORENICK
BY EMIL J. ORENICK

Sanford Schnurmacher
ATTORNEY.

CABLE RETAINER

In installation of electrical wires, cables, conduits, and the like, it is desirable that such articles be secured rigidly and supported at various points along their length to protect them from damage and also as a matter of safety and appearance. It is also desirable that devices used to secure and support these articles be relatively simple to install and capable of reliable service.

It is an object of this invention to provide a new and improved looped device for securing and supporting articles.

Another object is to provide a self-locking looped retainer that can be permanently anchored through a hole in a panel wall, or similar structural member, without requiring access to the inner or backside of such structural member.

Another object is to provide a device of the type stated that can be looped around the objects to be supported and permanently anchored in such a structural member hole without the use of any tools.

Still another object is to provide such a retainer that cannot be reopened without destroying it.

A further object is to provide a cable retainer of the type described whose loop can be easily adjusted to snuggly engage the units being retained, thus doing away with the necessity of providing individual retainers of different size to accommodate units of varied dimension.

These and other objects of the invention will become apparent from a reading of the following specification and claims, together with the accompanying drawing, wherein:

Figure 1:
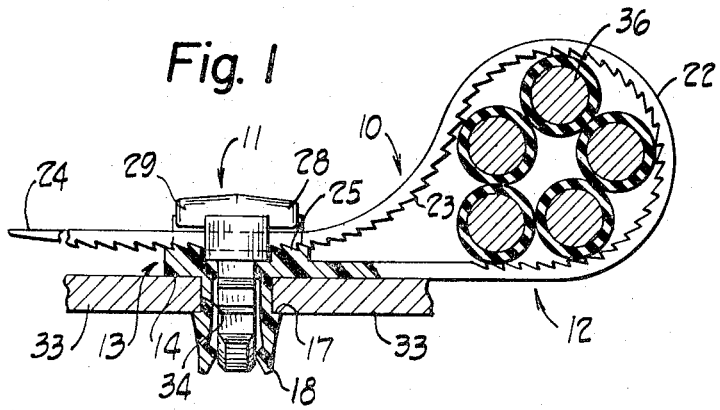
FIG. 1 is a side elevational view, partly in section, showing the cable retainer that is the subject of the invention mounted through a hole in a panel wall, with retained cables nested therethrough.

Referring more particularly to the drawing, there is seen in FIG. 1 the cable retainer that is the subject of the invention, broadly indicated by reference numeral 10, mounted on a panel wall 33 and retaining and supporting five electric cables 36.

The cable retainer 10 may be made of any material having the required physical characteristics of flexibility, dimensional and heat stability, freedom from sharp edges that might abrade the cables 36, and high dielectrical strength. A preferred material that meets all these qualifications is a plastic commonly known by the trademarked name "nylon." This plastic is tough, wear resistant, and stable under temperatures up to 300° F., which is most desirable for use around automobile engines, where elevated temperatures are common.

Figure 3:
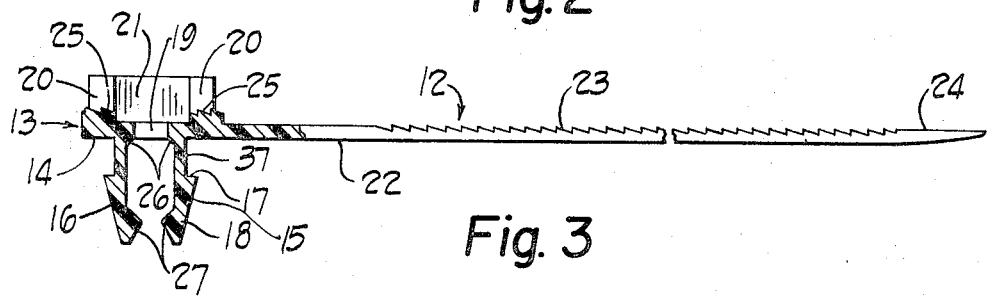
FIG. 3 is a side elevational view, of the same, with parts broken away and in section.
Figure 8:
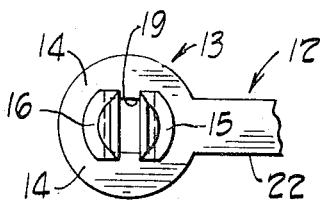
FIG. 8 is a bottom plan view of the anchor-plug.
Figures 5, 6:
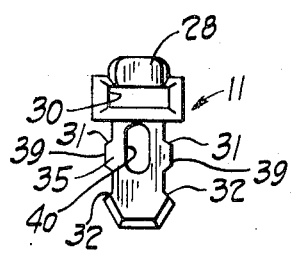
FIG. 5 is a side view of the lock-head.
FIG. 6 is an end view of the same.
Figure 7:
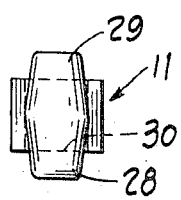
FIG. 7 is a top plan view of the lock-head.

The cable retainer 10 is made up of two separate elements, a strap unit, broadly indicated by reference numeral 12, and a lock-head, broadly indicated by reference numeral 11, as seen in FIGS. 1, 3 and 6.

Figure 2:
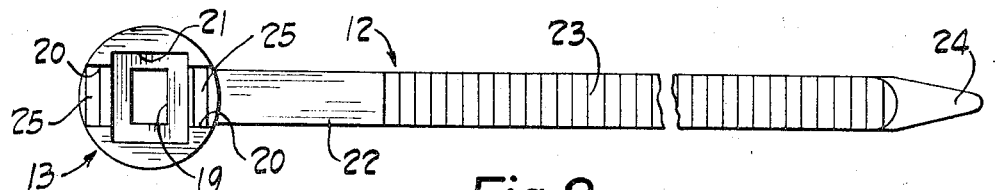
FIG. 2 is a top plan view of the cable retainer strap and anchor-plug in its extended, unmounted, condition.

The strap unit 12 comprises a substantially flat elongated flexible strap 22 having a series of parallel toothlike serrations 23 extending crosswise of its upper surface, as seen in FIGS. 2 and 3.

An anchor-plug 13 is formed integral with the strap 22, at one end thereof, while the free end 24 is reduced in cross section and beveled or otherwise rounded to permit the strap 22 to be guided into the passageway 30 of the lock-head 11, to be described hereinafter.

The anchor-plug 13 has a cylindrical head portion 14 with a dependent cylindrical stem 37, terminating in a conical head 18. The diameter of the stem 37 is less than that of the mounting hole 34 in the panel wall 33, so that the stem may snuggly fit through the hole 34. The diameter of the base 17 of the conical head 18 is greater than the diameter of the hole 34.

A rectangular axial bore 19 is centered through the anchor-plug 13, to define two opposed halves, or fingers 15 and 16, capable of being flexed toward or away from one another. The fingers 15 and 15 have opposed inner projections 27 at their lower ends, and an abutment 26 at their upper ends, as is seen most clearly in FIG. 3.

Reference numeral 20 indicates a horizontal rectangular groove cut in the top surface of the anchor-plug cylindrical head 14, in alignment with the strap 22. Reference numeral 25 indicates a series of toothlike serrations cut in the lower surface of the groove, and shaped to receive the strap serrations 23 in interlocking engagement, as set forth hereinafter.

Reference numeral 21 indicates a rectangular counter bore, of larger cross section, centered in the bore 19, and terminating in the anchor-plug cylindrical head portion 14 immediately below the lower surface of the groove 20, as again seen in FIGS. 2 and 3.

The lock-head 11 has a rectangular, smooth-walled passageway 30 of a width and depth to receive the strap 22 therethrough; and a dependent rectangular expander shank 35 positioned at 90° to the horizontal plane of the passageway 30, and crosswise thereof, as seen in FIG. 6. The expander shank 35 has smooth, parallel, sidewalls 38, as again seen in FIG. 6, and parallel end walls 39, as seen in FIG. 5, each with aligned, spaced, upper and lower notches 31 and 32, respectively.

An elongated cavity 40 in the shank body 35 serves to provide increased flexibility between the shank end walls 39, so the end walls may be made to move toward on another to permit the shank to pass across the anchor-plug abutments 26, to successively engage its lower and upper notches 32 and 31 with abutment 26, as described hereinafter.

Reference numerals 28 and 29 indicate oppositely projecting, horizontally extending lugs, located immediately above the plane of the lock-head passageway 30, in alignment therewith.

The procedure in mounting the cable retainer 10 in a hole 34 in a panel wall 33 is as follows:

The anchor-plug 13 is placed in line with the hole 34 in panel wall 33. The small end of the conical head 18 is inserted in the hole 34 and pushed therethrough. Due to the fact that the base 17 is normally of larger diameter than the hole 34 the two halves 15 and 16 will flex toward each other until the diameter of the base 17 is reduced enough to pass through the hole 34. As the head 18 reaches the back side of the panel wall 33 the two head halves 15 and 16 will expand to their normal positions, wherein the base end 17 will seat against the back side of the wall 33, with the stem fitted through the hole 34, and the cylindrical head portion 14 of the strap 12 seated against the front side of the wall. It will be observed that all this is accomplished without need for access to the back side of the panel wall 33.

The shank 35 of the lock-head 11 is inserted in the anchor-plug axial bore 19 and pushed therein until the first, or lower end wall notches pass across the abutment 26. The lock-head will now be held against withdrawal by the abutment which is engaged by the shank notches 32, when reverse movement is attempted.

At the same time the spacing between the shank sidewalls 38 prevents the plug halves 15 and 16 from moving toward each other, initially anchoring the plug 13 in place.

Figure 4:
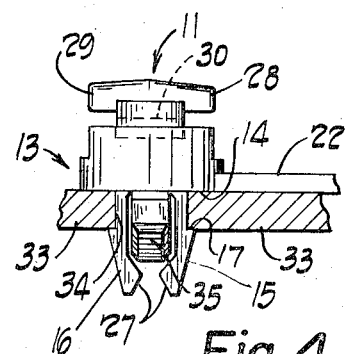
FIG. 4 is a side elevational view of the cable retainer showing its anchor-plug seated through a hole in a panel wall with the lock-head inserted in the anchor-plug in a semilocked, first position.

As again seen in FIG. 4, when the lock-head 11 is in this, first, locking position the passageway 30 is above and clear of the plane of the anchor-plug groove 20.

The strap 22 is then flexed upon itself and looped around the bundled cables 36. The free end 24 of the so looped strap is inserted through the passageway 30 and pulled up until the cables 36 are held in the desired position.

The lock-head shank 35 is then pushed further into the anchor-plug 13 until its upper, or second, notches 31 engage the abutment 26. In this second, or final lock, position the lower end of the shank 35 is positioned between the projections 27 of the anchor-plug conical head halves 15 and 16, maintaining them in an outwardly inclined condition such that withdrawal through the panel wall hole 34 is absolutely impossible, as seen in FIG. 1.

At the same time the lock-head passageway 30 is moved downward into the groove 20 carrying the strap 22 with it.

In this position the lock-head lugs 28 and 29 bear against the top side of the strap 22, as again seen in FIG. 1, to press the strap serrations 23 into interlocked engagement with the serrations 25 on the bottom of groove 20.

The so engaged strap 22 cannot be moved in either direction in the passageway 30, nor can the lock-head 11 be withdrawn from the anchor-plug 13, which in turn is permanently anchored on the panel wall 33.

It will be apparent that a loop of any desired capacity may be created with this device, limited only by the length of the strap 22, thus doing away with the necessity of manufacturing units of different size. It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

We claim:

1. A two-piece, self-locking, cable retainer for supporting electric cables, and the like, from a panel wall, comprising in combination:
   1. an anchor member designed to be received within an aperture in a panel wall;
   2. the anchor member having a cylindrical head with a dependent stem terminating in a conical head;
   3. the diameters of the bases of the cylindrical and conical heads being greater than that of the panel wall aperture, the diameter of the stem being less than that of said aperture;
   4. a substantially flat flexible strap formed integrally with the cylindrical head and extending laterally therefrom;
   5. the strap having a plurality of toothlike serrations extending crosswise of its upper surface, the length thereof;
   6. the cylindrical head having a diametric groove, of rectangular cross section, open to the top, cut in its upper face, in alignment with the strap;
   7. the bottom wall of said groove having a plurality of crosswise toothlike serrations;
   8. the anchor member also having a rectangular axial bore therethrough, providing an abutment at the base of the cylindrical head and dividing the stem and conical head into two identical halves free to flex toward or away from each other;
   9. a lock member having a head portion with a smooth-walled passageway, of a cross-sectional configuration to receive the free end of the strap therethrough, and an outwardly projecting lug positioned immediately above each end of the passageway;
   10. a rectangular shank formed integrally with the head portion and depending therefrom in a plane normal to the long axis of the passageway;
   11. the shank having parallel sidewalls faced lengthwise of the passageway, and parallel end walls faced crosswise of the passageway, the shank end walls having paired and spaced lower and upper notches; and
   12. the anchor member stem being positioned through the panel wall aperture with the base of its conical head positioned against the back side of the wall; the lock member shank being nested within the anchor member bore to hold the halves of the stem and conical head away from each other; the lock member shank being movable inwardly of the between a first, initial, locking position wherein the anchor member bore abutment is engaged by the shank lower notches, and a second, final, locking position, wherein the anchor member bore abutment is engaged by the shank upper notches; when the lock member is in its first position the head passageway is clear of the anchor head groove, allowing the strap to be flexed upon itself and its free end pulled through the passageway with its serrations faced toward the anchor head groove serrations; when the lock member is in its second position its passageway is nested within the anchor member groove, with the strap and groove serrations held in pressed interlocking engagement by the lock member lugs, to provide a cable retaining loop immovably mounted on the panel wall.